Feb. 6, 1951 — C. W. HANSELL — 2,540,614
ELECTROMECHANICAL AMPLIFIER
Filed May 22, 1948
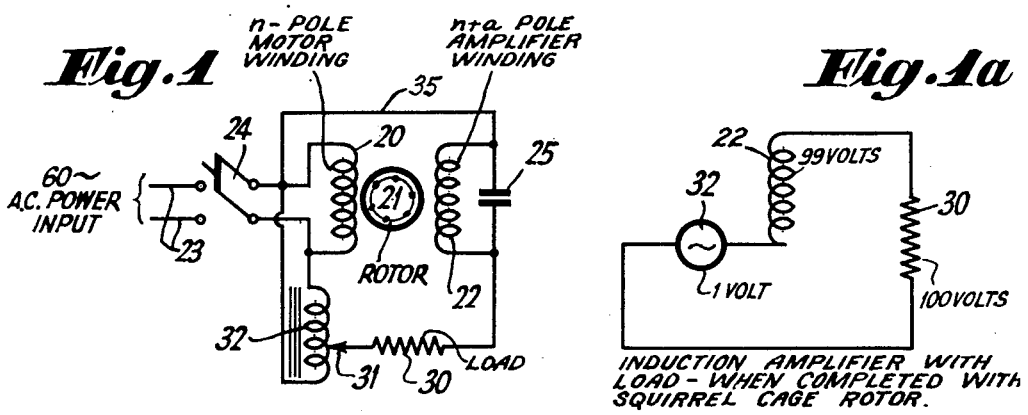
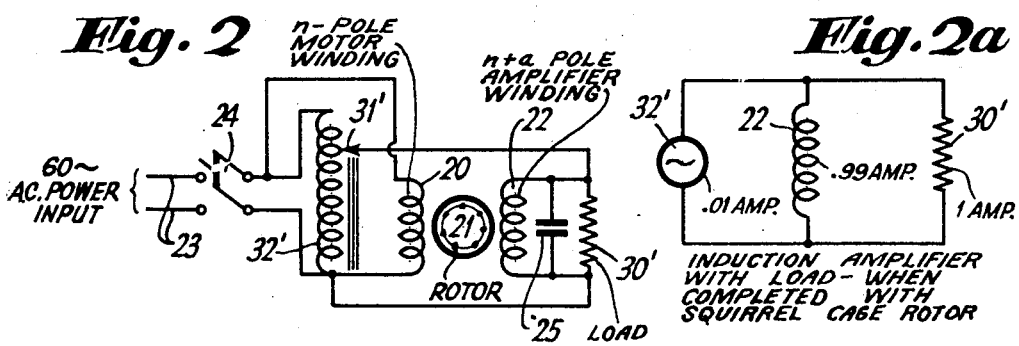
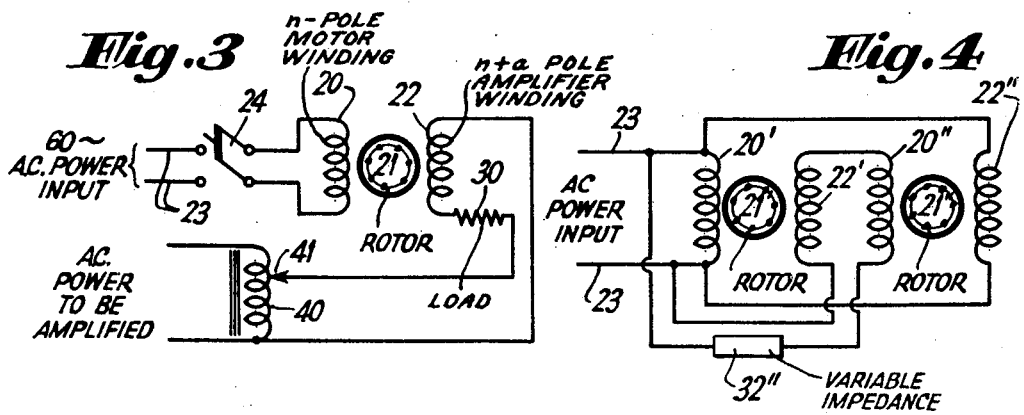
INVENTOR
CLARENCE W. HANSELL
BY
ATTORNEY Patented Feb. 6, 1951

2,540,614

UNITED STATES PATENT OFFICE

2,540,614

ELECTROMECHANICAL AMPLIFIER

Clarence W. Hansell, Port Jefferson, N. Y., assignor to Radio Corporation of America, a corporation of Delaware Application May 22, 1948, Serial No. 28,670

9 Claims. (Cl. 171—181)

The present invention concerns an electromechanical amplifier, and more specifically an induction generator arrangement employed for amplifying purposes.

In accordance with the invention, a single machine is made to serve both as an induction motor and as an induction generator. Two sets of windings are provided in the stator, so arranged as to give a different number of poles for the two sets of windings. A common rotor is utilized which is driven below synchronous speed, insofar as one set of windings is concerned, and above synchronous speed insofar as the other set of windings is concerned. As an illustration, one set of windings may produce 10 poles while the other set of windings may produce 12 poles. By proper design of the machine of the invention, particularly with respect to the degree of saturation of the iron of the magnetic circuits, the coupling between the two sets of stator windings for both motor and generator is made to be very small, aside from that provided by power transfer to and from the rotor by the amplifying process.

A more detailed description of the invention follows, in conjunction with a drawing, wherein:

Fig. 1 shows a schematic circuit diagram of one embodiment of the induction motor-generator amplifier of the invention, in which the load is controlled and in series with the winding having the greater number of poles;

Fig. 1a is a schematic electrical circuit diagram of the generator-amplifier portion of the system of Fig. 1;

Fig. 2 is a schematic circuit diagram of another embodiment of the invention, in which the load is in shunt with the winding having the greater number of poles;

Fig. 2a is a schematic electrical circuit diagram of the generator-amplifier portion of the system of Fig. 2;

Fig. 3 is a modification of the embodiment of Fig. 1; and

Fig. 4 is a third embodiment of the invention comprising a combined induction-motor-amplifier and variable speed induction motor.

Referring to Fig. 1, there is shown an electromechanical amplifier comprising one set of windings 20 producing in effect $n$ poles, for example, ten poles, and a rotor 21. Elements 20 and 21 constitute an induction motor (if desired, of the well known squirrel cage type) following known principles set forth for example in the Standard Handbook for Electrical Engineers published by McGraw-Hill Book Company. The rotor 21 may comprise a plurality of laminations on a shaft.

Superimposed on the stator is another set of windings 22 producing in effect $n+a$ poles, let us say, 12 poles. The number of poles produced by one set of windings differs by an even number $a$ from the number of poles produced by the other set of windings. Only one winding or one phase circuit has been shown for elements 20 and 22, merely in the interest of simplifying the drawing. In practice, each set of windings 20 and 22 may comprise a three-phase arrangement with three windings arranged in star or delta fashion. Power input to drive the rotor 21 as an induction motor is obtained from an A. C. power source represented by leads 23. The source 23 is connected through switch 24 to the set of windings 20. One terminal of switch 24 is connected to one terminal of the set of windings 22 via lead 35. Set of windings 22 is arranged in series with load 30 to a tap 31 on a variable control element 32, in turn, connected to set of windings 20 and the A. C. power source. The condenser 25 across the winding 22 is optional. Its purpose is to provide a reactive component of current in winding 22 to supply a part of the excitation for the generator-amplifier and to provide a form of regeneration to increase the amplification.

Element 32 is an adjustable auto-transformer and serves as a small source of variable A. C. power which is connected in series with the load 30 and the set of windings 22 producing the greater number of poles. This small source of variable power is added to or amplified by the induction generator part of the machine. The condenser 25 supplies auxiliary excitation current and is of proper value as to not quite cause the machine to be a self-excited generator.

The set of windings 20 produces a rotating magnetic field which rotates at a speed greater than the speed of the rotor 21. The rotor 21, in turn, rotates at a speed which is greater than the speed of rotation of the magnetic field produced by the stator circuit 22 of the generator. The strength of the magnetic field produced by either set of windings 20 or 22 alone should, as a maximum, be on the order of magnitude of half that commonly used on such machines when they are used as either an induction motor or as an induction generator. As a result, there is delivered to the load a controllable amount of A. C. power of much greater value than that obtained from the source of variable A. C. power.

The operation of the machine of Fig. 1 may be better understood by referring to the equivalent electrical circuit shown schematically in Fig. 1a. Assuming that (due to power input from source 23 the rotor of the machine is rotating mechanically with respect to winding 22 at a rate above synchronous speed, for the operating frequency of source 32, then the winding 22 will exhibit a negative resistance, which is characteristic of induction generators. If, by means of source 32, a current is made to flow through winding 22 and load resistance 30, then winding 22 acting as a negative resistance induction generator generates a voltage in a direction tending to increase the current through source 32, winding 22 and load 30. Under steady state conditions, since the elements 32, 22 and 30 are all in series, it will be apparent that they all will carry the same current. However, since the winding 22 is acting as an induction generator, its generated voltage is added to the voltage of source 32 to produce a much higher total voltage across load 30. Therefore, the power delivered to load 30, which is the product of voltage and current, when they are in phase, may be very much greater than that delivered by variable source 32. In other words, there will be voltage and power amplification between source 32 and load 30 due to the negative resistance of winding 22.

Suppose, as an example, that the variable control element 32 furnishes power at 60 cycles, 1 volt and one ampere to the series circuit of windings 22 and load 30, then the A. C. power appearing across, or taken from the windings 22 might be effectively somewhat more than 99 volts while that delivered to the load might be 100 volts A. C. It will thus be seen that 1 volt A. C. from the variable control element 32 has been increased to 100 volts A. C. in the load, with the same magnitude of current and the ratio of voltage and power gain will then be 100 to 1. If the voltage and current from source 32 are varied, then the power in load 30 will vary in response.

In practice, the voltage generated by an induction generator, such as 22, is not in phase with the current but lags behind the current by some angle depending upon conditions. Putting it the other way around, the current always has a leading phase relation with respect to the induced voltage and it is the component of current 90 degrees leading the voltage which supplies the excitation for the generator. This component of current of 90 degrees leading phase can be at least partially supplied by means of condensers connected across the terminals of the induction generator windings. This results in a circulation of A. C. current between the windings and condensers after the manner of the well known condenser or self-excited induction generator. In the present case, to retain amplifier stability, the condensers are preferably omitted, or made too small in capacity to supply full excitation.

Fig. 2 illustrates an embodiment of the invention wherein a small current is converted to a considerably amplified current. The elements of Fig. 2 which correspond to Fig. 1 have been given the same reference numerals. The load 30' in Fig. 2 is now in shunt with the set of windings 22 having the greater number of poles, and also in shunt to the auto-transformer 32' which constitutes a variable A. C. voltage source. A variable tap 31' on the control element 32' furnishes a desired amount of excitation voltage and current to the set of windings 22. By referring to the equivalent electrical circuit of Fig. 2a, it will be seen as a typical example, that 100 volts, 60 cycles, A. C. power having a current of .01 ampere obtained from tap 31' may be converted to the same A. C. voltage with 1 ampere of current in the load 30'. The current and power amplification is then 100 fold.

The source of variable power 32 in Fig. 1 may have a frequency which is either the same or somewhat different from that of the A. C. power source 23 connected to the set of windings 20 producing the smaller number of poles, which last winding is used to drive the rotor 21 as an induction motor. If, however, the A. C. power source 23 is used to provide the variable A. C. power, as in Fig. 2, then the frequencies will be the same.

If very large frequency differences between the frequency of the drive power and of the amplified power are desired, the relative number of poles produced by the two sets of windings 20 and 22 may be varied in two pole steps up or down. The only requirement is that the speed of rotation of the rotor will be in a more or less correct range above the synchronous speed for the frequency of current impressed upon the amplifier set of windings 22.

The variable power to be amplified need not be derived from the same power system. If desired, another power system can supply the variable power source. Such an arrangement is shown in Fig. 3, wherein the set of windings 22 and the load 30 are arranged in series and connected to a tap 41 on auto-transformer 40, in turn coupled to the A. C. power to be amplified.

Fig. 4 shows an arrangement wherein two devices of the invention are arranged in cascade. The first induction motor-generator-amplifier comprises the ten pole winding 20', the rotor 21' and the twelve pole winding 22', while the second induction motor-generator amplifier comprises the ten pole winding 20'', the rotor 21'' and the twelve pole winding 22''. The two sets of windings 22' and 20'' are arranged in series with each other and in series with a variable reactance control element 32''. It will be seen from an inspection of Fig. 4 that a combined induction motor-induction generator-amplifier 20', 21', 22' controls the speed of a variable speed induction motor 20'', 21''. By means of the variable reactor 32'', it is possible to control the relative amount of power delivered to the ten pole winding 20'' of the induction motor, in turn, causing the speed of the second induction rotor 21'' to vary. The reason for this is that rotor 21'', if driven by 12 pole winding 22'' alone, will run at some speed dependent on number of poles and load whereas if it is driven by 10 pole winding 20'' it will run at a higher speed. By varying the current in winding 20'' in response to change in reactor 32'' the motor speed can then be varied over a range.

The device of the present invention may be used as an A. C. power amplifier in all sorts of servo-mechanisms which are required in industry. The invention may be used as an amplifier in connection with driving rolls in continuous process paper mills, printing presses, steel mills, etc., where automatic control of roll speeds must be applied to keep materials moving at correct speeds, and will respond with variations in amplitude and frequency of relatively large amounts of power to variations in amplitude and frequency of relatively small amounts of power, serving the function of an induction-generator-amplifier.

What is claimed is:

1. An electromechanical amplifier comprising an alternating current induction motor having a set of stator windings producing a predetermined number of poles, and a rotor, and another set of windings producing a greater number of poles than said first set of windings, both sets of windings being superimposed relative to each other, means for supplying excitation current to said other set of windings, said rotor being driven by said first set of windings and serving to deliver energy to said other set of windings, and means for connecting a load to said other set of windings.

2. An electromechanical amplifier comprising an alternating current induction motor having a set of stator windings producing a predetermined number of poles, and a rotor, and another set of windings producing a greater number of poles than said first set of windings, both sets of windings being superimposed relative to each other, a variable A. C. power source for supplying excitation current to said other set of windings, said rotor being driven by said first set of windings and serving to deliver energy to said other set of windings, and means for connecting a load to said other set of windings.

3. An induction motor-generator-amplifier comprising a stator having two sets of superimposed windings, said sets respectively producing different numbers of poles, a common rotor for said two sets of windings, means for supplying the set with the smaller number of poles with A. C. power to drive said rotor, and means for supplying the set with the larger number of poles with excitation current or voltage to be amplified.

4. An induction motor-generator-amplifier comprising a stator having two sets of superimposed windings, said sets respectively providing in effect different numbers of poles, a common rotor for said two sets of windings, means for supplying the set with the smaller number of poles with A. C. power to drive said rotor, and a variable A. C. power source coupled to the set having the larger number of poles, said elements being so designed that the magnetic field produced by either set of windings alone is, as a maximum, on the order of magnitude of half that commonly used when the device is used as either an induction motor or as an induction generator.

5. An electromechanical amplifier comprising an alternating current induction motor having a set of stator windings so wound as to produce a predetermined number of poles, and a rotor, and another set of windings so wound as to produce a greater number of poles than said first set of windings, a condenser in shunt to said other set of windings, both sets of windings being superimposed relative to each other, a variable A. C. power source supplying excitation current to said other set of windings, said rotor being driven by said first set of windings and serving to deliver energy to said other set of windings, and means for connecting a load to said other set of windings.

6. An electromechanical amplifier comprising an alternating current induction motor having a set of stator windings so wound as to produce a predetermined number of poles, and a rotor, and another set of windings so wound as to produce a greater number of poles than said first set of windings, both sets of windings being superimposed relative to each other, a variable power source coupled to said other set of windings, and means for connecting a load in series with said other set of windings and with said variable power source.

7. An electromechanical amplifier as defined in claim 1, both sets of windings being superimposed relative to each other, a variable power source coupled in shunt to said other set of windings, and means for connecting a load in shunt to said other set of windings 8. A single electromechanical machine having two sets of windings in the same frame which have direct coupling between them substantially balanced out, one winding serving as part of an induction motor and the other as part of an induction generator-amplifier, and external means to vary the excitation potential, current and frequency of power delivered to the generator-amplifier to control the potential, current and frequency of power delivered to a load.

9. An electromechanical amplifier as defined in claim 1, characterized in this, that said means for supplying excitation current to said other set of windings comprise external means to vary the excitation potential, current and frequency of power to the other winding for controlling the potential, current and frequency of power delivered to the load.

CLARENCE W. HANSELL.

REFERENCES CITED

The following references are of record in the file of this patent:

UNITED STATES PATENTS

| Number | Name | Date |
| --- | --- | --- |
| 1,642,041 | Nyman | Sept. 13, 1927 |
| 1,760,591 | Forbes | May 27, 1930 |
| 2,206,920 | Riggs | July 9, 1940 |
| 2,359,886 | Wikkenhauser | Oct. 10, 1944 |